United States Patent
Wilson

(10) Patent No.: US 7,038,406 B2
(45) Date of Patent: May 2, 2006

(54) BI-DIRECTIONAL FIELD CONTROL FOR PROPORTIONAL CONTROL BASED GENERATOR/ALTERNATOR VOLTAGE REGULATOR

(75) Inventor: Scott R. Wilson, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 87 days.

(21) Appl. No.: 10/360,411

(22) Filed: Feb. 7, 2003

(65) Prior Publication Data

US 2004/0155632 A1    Aug. 12, 2004

(51) Int. Cl.
*H02P 7/66*    (2006.01)
*G05F 1/10*    (2006.01)

(52) U.S. Cl. .................. 318/140; 318/139; 361/18; 323/276; 322/28

(58) Field of Classification Search ............. 318/599, 318/341, 681, 254, 138, 439, 245, 812, 788, 318/800, 140, 139, 293, 667; 322/28, 38, 322/7, 8, 14, 46; 363/41, 65, 17, 98, 132; 361/18; 323/276

See application file for complete search history.

(56) References Cited

U.S. PATENT DOCUMENTS

| | | | |
|---|---|---|---|
| 3,609,514 A | 9/1971 | Nowakowski | |
| 4,471,288 A | 9/1984 | Morishita et al. | |
| 4,654,551 A | 3/1987 | Farr | |
| 4,710,686 A | 12/1987 | Guzik | |
| 4,794,312 A | 12/1988 | Kano et al. | |
| 4,973,896 A | 11/1990 | Shiga et al. | |
| 5,036,268 A | 7/1991 | Lahtinen et al. | |
| 5,038,728 A * | 8/1991 | Yoshida et al. | 123/198 R |
| 5,343,382 A | 8/1994 | Hale et al. | |
| 5,373,196 A * | 12/1994 | Faley | 322/28 |
| RE35,124 E | 12/1995 | Erdman et al. | |
| 5,481,176 A * | 1/1996 | DeBiasi et al. | 322/7 |
| 5,502,368 A | 3/1996 | Syverson et al. | |
| 5,545,971 A * | 8/1996 | Gomez et al. | 363/90 |
| 5,552,651 A | 9/1996 | Radomski | |
| 5,581,172 A | 12/1996 | Iwatani et al. | |
| 5,656,922 A | 8/1997 | LaVelle et al. | |
| 5,663,605 A | 9/1997 | Evans et al. | |
| 5,710,741 A | 1/1998 | McLaury | |
| 5,745,534 A * | 4/1998 | DeBiasi et al. | 322/29 |

(Continued)

FOREIGN PATENT DOCUMENTS

GB    2276050 A  *  9/1994
JP    2001178198 A  *  6/2001

OTHER PUBLICATIONS

Freescale Semiconductor, Inc. ☐☐Motorola "MCCF33095" or "MC33095" Integral Alternator Regulator☐☐www.freescale.com.*

*Primary Examiner*—Marlon T. Fletcher
*Assistant Examiner*—Eduardo Colon Santana
(74) *Attorney, Agent, or Firm*—Dickinson Wright PLLC

(57) ABSTRACT

An H-bridge switching topology for bi-directional field excitation to null the effects of a rotor's permanent magnets uses both a low-side and a high-side field excitation driver to control the rotor's average field current. A standard proportional control signal for generators using uni-directional field excitation is used to control an H-bridge for bi-directional field excitation. The H-bridge consists of two pair of power switches. In a preferred embodiment, the switches are n-channel MOSFETs. A drive circuit interfaces a logic block with the H-bridge in order to properly bias the power switches.

16 Claims, 12 Drawing Sheets

U.S. PATENT DOCUMENTS

| | | |
|---|---|---|
| 5,780,953 A | 7/1998 | Umeda et al. |
| 5,990,640 A * | 11/1999 | Dwyer et al. ............... 318/254 |
| 6,278,194 B1 | 8/2001 | Nakagawa et al. |
| 6,456,024 B1 * | 9/2002 | Schmider et al. ........... 318/254 |
| 6,777,846 B1 * | 8/2004 | Feldner et al. .............. 310/200 |
| 2003/0155813 A1 * | 8/2003 | Walter ......................... 307/31 |
| 2003/0189338 A1 * | 10/2003 | Rose ........................... 290/1 R |
| 2004/0108789 A1 * | 6/2004 | Marshall ..................... 310/216 |

* cited by examiner

BI-DIRECTIONAL FIELD CONTROL FOR PROPORTIONAL CONTROL BASED GENERATOR/ALTERNATOR VOLTAGE REGULATOR

BACKGROUND OF THE INVENTION

This invention is related to the field of voltage control. More particularly, it is related to the field of controlling a generator/alternator made with a permanent magnetic field.

SUMMARY OF THE INVENTION

The invention comprises a method of controlling voltage using bi-directional field excitation current, comprising the steps of measuring a field driver control signal's pulse width by counting a number of clock cycles that occur when the field driver control signal is high, determining whether the field driver control signal's duty cycle is above or below a threshold by comparing a bit count, supplying reverse field current if the field driver control signal FD duty cycle falls below a reverse direction threshold, and supplying forward field current if the field drive duty cycle exceeds the threshold.

In another embodiment, the step of supplying reverse field current further comprises the steps of turning a first switch on and pulse width modulating a second switch on and off, whereby reverse current is supplied to a rotor and generator output is decreased and whereby the effects of permanent magnets are nulled.

In another embodiment, the step of supplying forward field current further comprises the steps of turning a third switch on and turning a fourth switch on and off with a duty cycle corresponding to the field driver control signal's duty cycle, whereby forward current is supplied to the rotor and the generator output is increased.

In another embodiment, the invention comprises a voltage regulator, comprising a logic block, a controller having a field driver control output operably connected to a first input of the logic block, an H-bridge, a drive block operably connected between the H-bridge and the logic block, and a power train control module operably connected between the controller and the drive block.

In another embodiment, the H-bridge comprises a first pair of switches, comprising a first and a second switch connected in series, a second pair of switches, comprising a third and a fourth switch connected in series, wherein the first and second pair of switches are operably connected in parallel across a power source; and a rotor is operably connected between the series connections of the first and second pair of switches.

In another embodiment, the logic block comprises a counter having an output, whereby a number of clock cycles that occur when a field driver control signal is high is counted and a comparator, whereby the output from the counter is compared to a threshold.

In another embodiment, the driver block comprises a mode signal input and a pulse width modulation input operably connected to corresponding outputs of the logic block, a first output signal operably connected to a control input of the first switch, whereby the first switch is on when the mode signal is high, a second output operably connected to a control input of the second switch, whereby the second switch is pulse modulated on and off when the mode signal is high, a third output signal operably connected to a control input of the third switch, whereby the third switch is on when the mode signal is low; and a fourth output operably connected to a control input of the fourth switch, whereby the fourth output signal's duty cycle equals the field driver control signal's duty cycle when the mode signal is low.

In another embodiment, the power control module comprises an output operably connected to an input of the controller, whereby a pulse width modulated signal is transmitted to the controller and an input is operably connected to an output of the logic block, whereby the power control module receives a torque demand signal.

Further scope of applicability of the present invention will become apparent from the following detailed description, claims, and drawings. However, it should be understood that the detailed description and specific examples, while indicating preferred embodiments of the invention, are given by way of illustration only, since various changes and modifications within the spirit and scope of the invention will become apparent to those skilled in the art.

BRIEF DESCRIPTION OF THE DRAWINGS

The present invention will become more fully understood from the detailed description given here below, the appended claims, and the accompanying drawings in which:

DETAILED DESCRIPTION OF THE PREFERRED EMBODIMENT

This disclosure describes an H-bridge power switching control method that interfaces with an existing proportional control based automotive generator/alternator voltage regulator. It controls rotating machines that use rotors supplemented with permanent magnets that would otherwise have uncontrolled voltage levels without the bi-directional field current that the H-bridge provides. Generally, there are three methods for controlling a generator/alternator made with a permanent magnetic field: 1) voltage, control via rectification; 2) voltage control via a DC-DC converter; and 3) voltage control via bi-directional field excitation current. The present invention uses the third method. The present invention comprises a method of monitoring the uni-directional field control duty cycle as a means of determining if the system voltage is rising and going out of control. If the system voltage exceeds a voltage range, the logic then provides reverse field current in a pulse width modulation (PWM) fashion to null the effects of the permanent magnets. The uni-directional field duty cycle is continually monitored to determine when the reverse current is no longer needed.

Problem Solved

Figure 1:
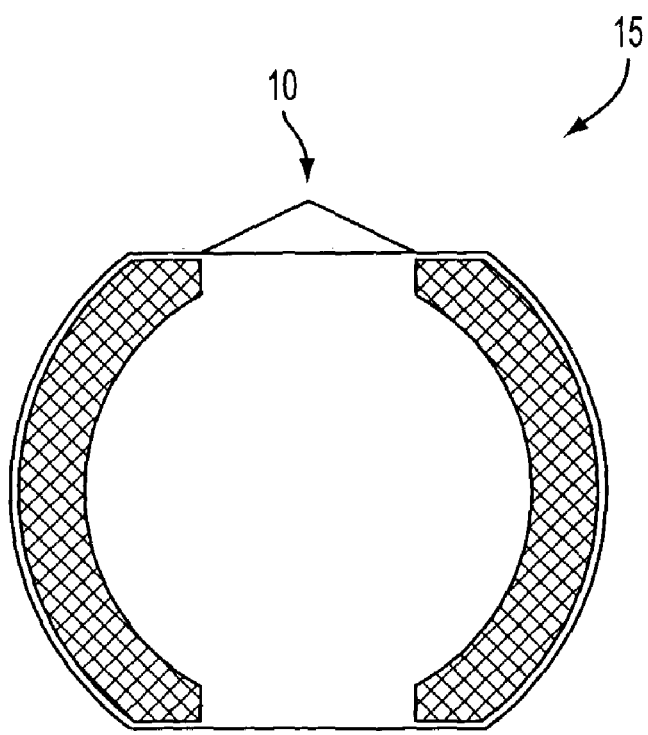
FIG. 1 is a view of the rotor of the present invention.
Figure 2:
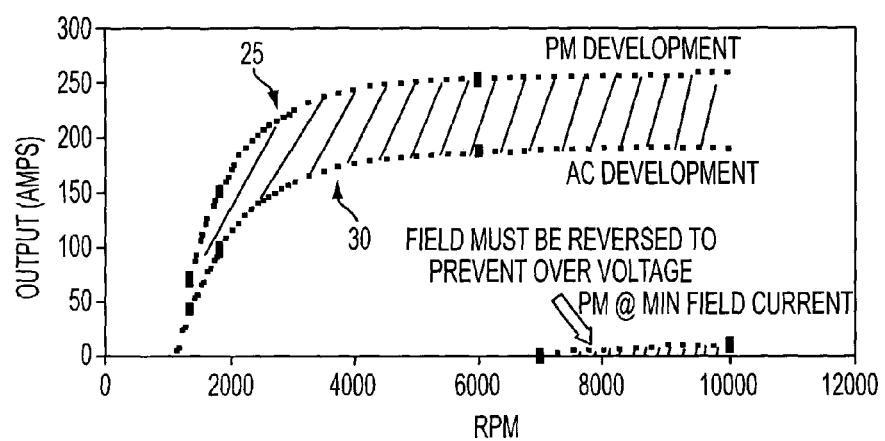
FIG. 2 is a plot of generator/alternator output in amps vs. speed in RPM where permanent magnets are embedded in the rotor.

Permanent magnets (PM) 10 (shown in FIG. 1) are used in rotors 15 to produce a high output level at low speeds. This difference can be seen in FIG. 2 where the output of a generator/alternator (measured in amps) is plotted against engine speed in rpm for a rotor 15 containing permanent magnets 25 and for one that does not have permanent magnets (PM) 30. The currents were measured at 25 deg C. For an operating speed of 2,000 rpm, there is an over 50 Amp difference in output current. Thus, using permanent magnets, the alternator will produce a full rated output at low speeds. However, as the rpm of the alternator increases, the magnetic flux from the magnets 10 produces an even greater output. When the engine speed exceeds a threshold, the flux from the permanent magnets (PM) 10 is too great. To avoid damage caused by over voltages due to excessive generator/alternator output current, the magnetic flux is reduced. From FIG. 2 it is apparent that at 8000 rpm, the field is reversed to prevent over voltage due to the rotor 15 with embedded magnets 10.

One class of generator voltage regulators uses proportional control for maintaining the desired system voltage. Either a low-side or a high-side field excitation driver is used to control the rotor's 15 average field current. The driver operates at a constant switching period and variable duty-cycle. The system voltage generated when the field excitation duty-cycle equals 50% is the desired set point voltage. Deviations from the set point are directly proportional to the field excitation duty cycle (e.g., duty-cycle=0.5+3*Verror). However, a regulator with either a low-side or high-side field drive can not adequately control a generator with permanent magnets embedded in its rotor because excessive system voltage is possible at low electrical loads and sufficient rotational speed as discussed above.

Solution

An H-bridge switching topology for bi-directional field excitation is required to null, when desired, the effects of the rotor's 15 permanent magnets 10 (i.e., magnetic field is governed by current polarity). The present invention uses both a low-side and a high-side field excitation driver to control the rotor's 15 average field current. With proper interface logic, the standard proportional control signal for generators/alternators using uni-directional field excitation can control an H-bridge for bi-directional field excitation (see FIG. 3). The logic uses a field driver control signal's duty cycle 66 to determine whether to supply forward or reverse field current is applied to the rotor 15. The present invention also compares the field drive control signal's duty cycle 66 to a threshold a predetermined number of times to filter out duty-cycle noise before supplying reverse field current. Reverse field current will generate a flux to oppose the flux generated by the magnets 10, thus reducing output voltage to a desired level.

Figure 3:
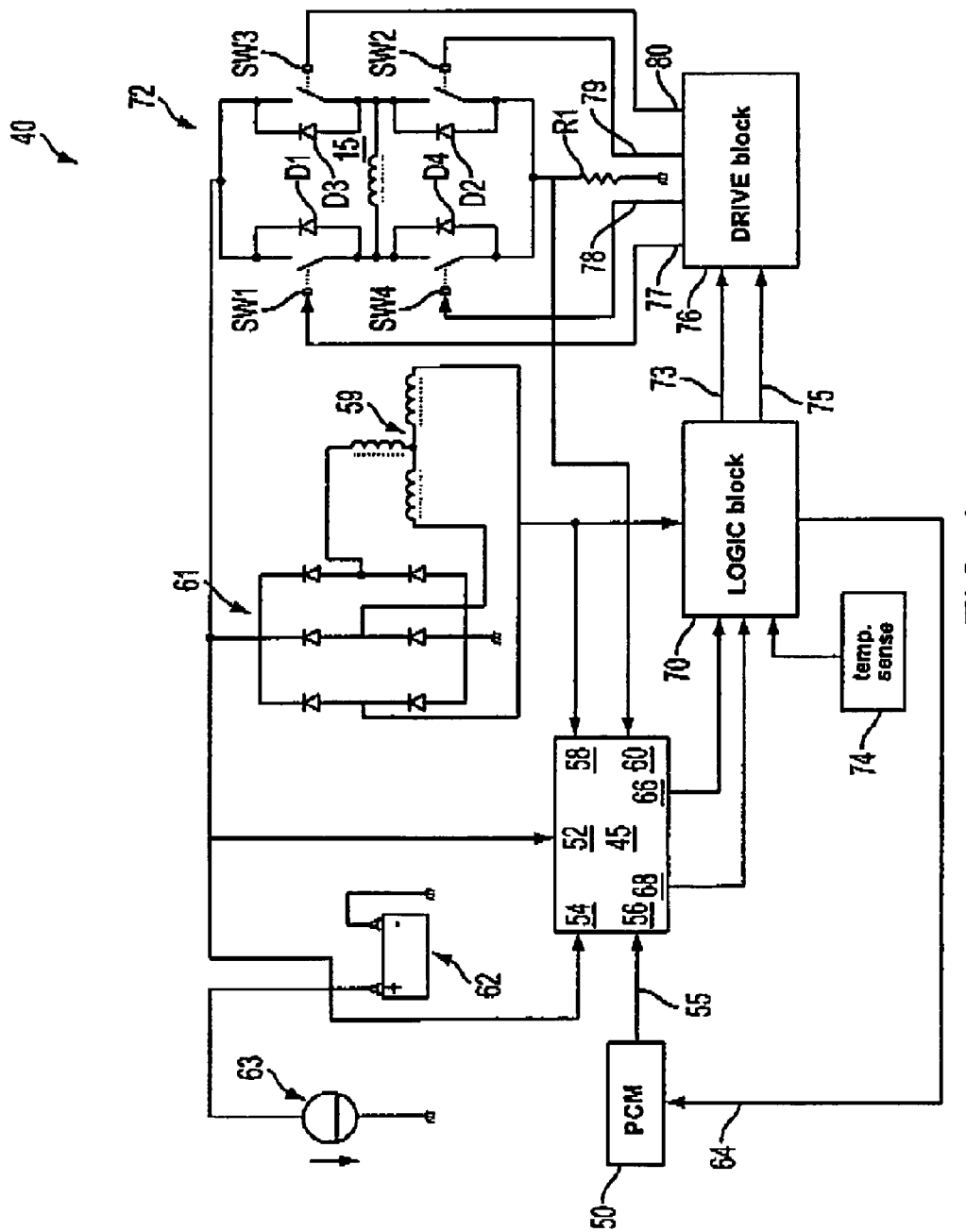
FIG. 3 is part of a block diagram of a generator/alternator voltage regulator used for bi-directional field excitation.

FIG. 3 is a block diagram of a generator voltage regulator 40 used for bi-directional field excitation. The Externally-Controlled Integral Alternator Regulator (ECIAR) block 45 is the proportional controller for standard uni-directional field excitation. In a preferred embodiment, the ECIAR 45 is an application specific integrated circuit (ASIC) used in Visteon voltage regulators. One such ECIAR 45 is disclosed in U.S. Pat. No. 5,481,176, hereby incorporated by reference. The power train control module (PCM) 50 determines the set point voltage. The power train control module (PCM) 50 can infer the lead acid battery temperature based on the power train control module's sensor inputs and logic to determine an appropriate charging system voltage.

The ECIAR's inputs are AP (generator B+output) 52, SNS (external battery sense) 54, RC (voltage set point communication input signal alt_com which is received from the power train control module 50) 56, STA (stator winding input for rotational speed sensing) 58 and CL (input from current sense element for excessive field current protection) 60. The SNS input 54 is connected to the positive terminal of the lead-acid battery 62 in order to sense the voltage of the battery 62. The STA input 58 is connected to one winding of the stator 59 to sense rotational speed. The stator is connected to a rectifier 61. Unless an alternating voltage (characteristic of the output of one phase of a three phase alternator) is seen at pin STA 58, a fault is indicated. The RC input 56 is used to wake up the ECIAR 45. The ECIAR 45 goes into a quiescent state when the vehicle is not being operated and the charging system is not needed. ECIAR 45 wakes up when it sees the pulse width modulated signal alt_com 55 provided by the power train control module (PCM) 50.

The ECIAR's 45 outputs are FD (field driver control signal) 66 and Load Indicator LI 68 (fault indication and FD duty-cycle signal input for power train control module). The field driver control signal output FD 66 is a signal whose duty cycle is indicative of the system voltage. The load indicator output LI 68 has the ability to sink output, thereby having the ability to provide a "low" output to the LOGIC block 70. By providing a "low" continuously, the ECIAR 45 indicates that a charging system fault has been detected by the PM voltage control regulator 40.

The LOGIC block 70 is the bi-directional field excitation controller for the H-bridge 72. Its inputs are FD 66, LI 68, and information from a temperature sense element 74. The outputs are the four signals required to control each of the four switches that comprise the H-bridge 72 or a field excitation direction and intensity signal (i.e., direction and pwm respectively).

A DRIVE block 76 interfaces the LOGIC block 70 with the H-bridge 72 in order to properly bias the power switches (e.g., n-channel enhancement MOSFETs). Included in the LOGIC block 70 are the necessary bias circuitry, level shifters and clock signal to implement the digital functions. In this implementation, the LOGIC block 70 is a programmable logic device (PLD). The DRIVE block 76 can include charge pumps for high-side field drive. In another embodiment, the DRIVE block 76 can be an off-the-shelf H-Bridge power MOSFET controller commonly used for DC motor control.

The H-bridge 72 consists of a first pair of power switches SW1 and SW2 and another pair of power switches SW3 and SW4. In a preferred embodiment, the switches are n-channel MOSFETs. Devices SW1 and SW3 have their drain terminals connected to the positive terminal of a power supply in the form of a lead acid battery 62. A vehicle load 63 is also connected to the positive terminal. Devices SW1 and SW3 have their sources connected to the drains of devices SW4 and SW2 respectively. The sources of SW4 and SW2 are connected to ground potential through resistor R1 and to the current sense input CL 60 of the ECIAR block 45 which receives input from the current sense element R1 for detecting excessive field current.

Each of the switches SW1 and SW3 is shunted between the drain and source terminals by flyback diodes D1 and D3, respectively, which are polarized oppositely with respect to the drain-source junction. Similarly, the switches SW4 and SW2 have their drain terminals and source terminals connected through opposite-polarized flyback diodes D4 and D2, respectively.

A rotor winding represented by 15 is connected between the drain terminals of power control devices SW4 and SW2. The driver stage configuration in which two pair of series connected power switches are connected in parallel across a power source, with rotor 15 connected between the junction of switches SW1 and SW4 and the junction of switches SW3 and SW2 is called an "H-bridge" configuration.

Current conduction to the rotor 15 is controlled by input signals 77–80 to the gates of the switches SW1–SW4. These input signals 77, 78, 79, 80 are sent in pulse width modulation (PWM) from the DRIVE block 76. Thus, the H-bridge circuit 72 controls the current conduction to the rotor 15 in accordance with the PWM signal.

Logic

FIGS. 4A to 4H are block diagrams of the bi-directional field control logic. It is a graphical description of the logic functions implemented using a programmable logic device (PLD). Blocks 90, 100, and 110 are located in the LOGIC block 70. The LOGIC block 70 receives signals in Block 90 indicative of the operational state of the generator/alternator, compares the signal in Block 100 with reference signals from block 10 representing the desired operational states and produces PWM command and field current direction command signals causing the alternator/generator to operate as desired. The DRIVE block 76 (FIG. 3) responds to the pwm and direction commands from the LOGIC block 70 to produce operating signals for controlling the switches.

The Drive block 76 produces signals to activate switches SW1 and SW2 or SW3 and SW4 depending on which field current direction is needed to maintain voltage regulation.

Reverse Drive Trigger

In Block 90 it is seen that the LOGIC block's PLD main input is the eciar_fd_bar signal. It is the inverse of the ECIAR's field driver control signal FD 66 because the field driver control signal FD 66 is level shifted for programmable logic device PLD compatibility. Block 90 monitors the uni-directional field control duty cycle as a means of determining if the system voltage is rising and going out of control. An advantage of using the field control duty cycle to monitor system voltage as opposed to other methods of monitoring system voltage is that this method avoids having to use an additional voltage comparator. The proportional controller in the ECLAR 45 uses a voltage comparator and it is difficult to implement an additional comparator to track its operation without introducing offset errors that lead to regulation inaccuracies. Thus, block 90 measures the field driver control signal's FD 66 pulse width. This essentially determines the field excitation duty-cycle. It does this by counting the number of clock cycles that occur when the field driver control signal FD 66 is high. The clock is a 16 kHz signal (16 kHz_clk) which is generated by dividing a master clock (in this instance, mstr_clk=2.048 MHz). The ECIAR's 45 main timer is also 16 kHz. Therefore, the logic implemented in the LOGIC block 70 PLD can easily migrate into a new regulator ASIC based on the ECIAR 45 design. The master clock in the programmable logic device PLD implementation enables a synchronous logic system and, therefore, avoids meta-stable logic states. In summary, the field driver control signal FD 66 pulse width is the up counter's value in block A (q[7 ... 0] from "my_counter") times the clock period (i.e., $\frac{1}{16}$ kHz).

Block 100 determines if the field drive control signal's FD 66 duty-cycle is either above or below a threshold level set by block 110. It does this by using a comparator, my_compare_low, to compare the 8-bit count determined by block 90 with an adjustable 8-bit limit set by block 110. The 8-bit limit depends on the initial state of the field driver control signal's FD's 66 pulse width—that is, if the field driver control signal FD's 66 pulse width, as determined by block 90's 8-bit word (i.e., q[7 ... 0] from "my_counter") is above the threshold, then the threshold is win[6.0] (i.e., a 7-bit setting). The threshold increases by hys[3 ... 0] (i.e., a 4-bit setting) when the pulse count is below the threshold. This is essentially an adjustable digital threshold with hysteresis. It determines when the field current direction is reversed so that it no longer flows in the direction aiding generator output.

The mode signal 75 (or direction signal in FIG. 3) controls the direction of the supply current (forward or reverse) supplied by the H-bridge 72. The mode signal 75 is set high and a pulse is triggered (i.e., rd_trigger) if the field drive duty-cycle falls below the reverse direction threshold. The mode signal 75 is set low and a different pulse is triggered (i.e., fd_trigger) when the field driver control signal's FD 66 duty cycle exceeds the threshold with hysteresis. These signals are used to control the on/off state of the H-bridge power devices, SW1–SW4. Thus, the mode signal 75 controls the direction of the field current supplied to the rotor 15.

In another preferred embodiment, an extra event filter can be added to block 100 that can adequately determine the "forward" to "reverse" field drive transition. In FIGS. 4A to 4H, mode is set high as soon as the field driver control signal's FD 66 duty cycle falls below the threshold window. An alternative method is to set mode high only after the field driver control signal's FD 66 duty cycle falls below the threshold window after a predetermined consecutive number of times. This filters field drive duty-cycle noise and provides a delay to distinguish system set point changes from either load or speed changes.

The adjustable parameters described above may be determined experimentally for a given generator/alternator design. A low-duty-cycle (i.e., <20%) for an extended period is an indication that the system voltage is above its target value. This is the indication needed to invoke a field polarity that opposes the permanent magnets. A reverse field current is applied to the rotor 15. The field driver control signal's FD's 66 duty-cycle will then begin to increase as the system voltage decreases under the influence of a "reverse" field polarity. Likewise, a moderate field duty-cycle (e.g., >20%) indicates that the field may be aided by the permanent magnets 10.

H-Bridge Power Device Control (Drive Block) 76

Blocks 120, 130, 140, and 150 are located in the Drive block 76. Blocks 120, 130, 140, and 150 produce commands for activating switches SW1 and SW2 or switches SW3 and SW4 depending on the direction or mode command signal 75, i.e., whether it is desired to supply reverse or forward current to the circuit. The gate terminals of MOSFETs SW1 thru SW4 act as control inputs.

Direction 1—Forward Field Current

Block 120 controls the on/off state of switch SW4 in the H-bridge 72 so that the field current increases the generator's output or electromotive force. Output signal QFL 78 gates switch SW4 on and off. In block 120 an AND gate and the mode signal with an inverted eciar_fd signal. The output of the AND gate is signal QFL 78. Thus, signal QFL's 78 duty cycle equals the ECLAR's 45 field driver control signal FD 66 duty-cycle so long as the mode signal 75 is low. Thus, switch SW4 is gated on and off with a duty cycle corresponding to the field driver control signal FD 66 duty-cycle.

QFL 78 is held low (turning switch SW4 off completely) if the mode signal 75 is high (i.e., only reverse field current needed). That is the field current direction is reversed so that it no longer flows in the direction aiding generator output. This circumvents the minimum field excitation duty-cycle inherent in the existing ECIAR design (i.e., a small amount of field current flows even if the system voltage is above the desired set point).

Block 130 outputs signal QFH 80 to control the corresponding power device in the H-bridge (switch SW3) so that field current increases the generator's output. QFH 80 is high (turning switch SW3 on) as long as the mode signal 75 is low. Thus, controls signals QFL 78 and QFH 80 gate switches SW3 and SW4 to supply field current to the motor to increase the generator output. When the mode signal 75 is low, switch SW3 is on and switch SW4 pulses on and off corresponding to the field driver control signal's FD 66 duty-cycle to supply forward current to the rotor to increase generator output. Thus forward field current flows from the positive terminal of the lead-acid battery 62 through switch SW3 through the rotor through switch SW4 through resistor R1 to ground. Like switch SW4, QFH 80 is held low (turning switch SW3 off completely) if the mode signal 75 is high (i.e., only reverse field current needed). The forward current conduction to the rotor 15 is controlled in accordance to the field driver control signal's FD 66 duty-cycle.

Direction 2—Reverse Field Current

Block 150 controls the on/off state of the power switch SW2 in the H-bridge 72 using signal QRL 79 so that the field current decreases the generator's output or electromotive force. That is, reverse field current is supplied by the H-bridge 72. It does this by setting up a magnetic field that opposes the magnetic field from the rotor's 15 permanent magnets 10. Output signal QRL 79 is input to the gate of switch SW2. QRL 79 starts to pulse width modulate (PWM) when mode is set high. When the mode signal 75 goes logic HIGH, the S-R flip flop is enabled. The output of the flip flop, signal QRL 79, is switched between 0 and 1 with a pulse width and pulse repetition rate determined by a threshold value loaded into the comparator and input signal fd_edge. Thus, block 150 functions as a pulse width modulation circuit whose output signal, QRL 79, gates switch SW2 on and off. The PWM nulls the effects of the permanent magnets 10 by supplying current in a direction which opposes the current induced in the field windings by the magnets 10. The PWM method allows for variations expected in the amount of reverse excitation needed to null the effects of the permanent magnets 10 by varying pulse width and pulse repetition frequency to vary the magnitude of the reverse current delivered to the circuit. However, a maximum pulse width limit that is adjustable is also used to limit the amount of reverse field excitation. Block 150 provides an increasing QRL 79 pulse width coincident with the ECIAR's 45 FD signal 66 so long as the mode signal 75 is high. The ECIAR 45 continues to produce an FD signal 66 at a low duty-cycle (i.e., 6.25%) at 125 Hz (typical) even if the system voltage is above set point and reverse field current is needed. The mode signal 75 enables block 150's S-R flip flop. The ECIAR's FD signal 66, via fd_edge, sets the S-R flip-flop. An up and down counter (my_counter4 and my_down_counter1 respectively) reset the S-R flip-flop to effectively form a succession of increasing pulse widths (see FIG. 4). The up counter is incremented every 8 msec (typical) via fd_edge and the S-R flip-flop is reset when the down counter finishes counting down from the up counter's value. The up counter is allowed to continue counting upward until a preset value is reach as governed by my_compare6 (a value corresponding to about 50% is typically needed as a reverse drive governor). QRL 79 is held low (turning switch SW2 off completely) if the mode signal is low (i.e., only forward field current needed).

Block 140 controls the corresponding power device SW1 in the H-bridge 72 using signal QRH 77 so that the field current direction reverses. QRH 77 is high so long as mode is high, turning switch SW1 on. When the mode signal 75 is high, switch SW1 is on and switch SW2 pulses on and off corresponding to the PWM characteristics to supply reverse current to the rotor to decrease generator output. Thus, reverse field current flows from the positive terminal of the lead-acid battery 62 through switch SW1 through the rotor 15 through switch SW2 through resistor R1 to ground. Thus, controls signals QRH 77 and QRL 79 gate switches SW1 and SW2 to supply reverse field current to the rotor 15 to decrease the generator output. The reverse current conduction to the rotor 15 is controlled in accordance to the PWM signal. The magnitude of the reverse current supplied to the rotor 15 is proportional to the duty cycle of the PWM signal. As the duty cycle increases, the average current that is supplied increases.

Blocks 130 and 140 control their corresponding H-bridge power devices so that there is a "make-before-brake" connection with the opposing device when mode changes state. The timing is adjustable so that there is maximum control over the field current recirculation during the "forward" to "reverse" field excitation transitions.

Alternatively, blocks 120, 130, 140 and 150 can be reconfigured to provide only two signals as shown in FIG. 3. The direction 75 and pwm signals 73 can then interface with a standard H-bridge MOSFET driver typically used for DC motor control. In addition, QFL 78 and QRL 79 do not necessarily need to control the low-side field drivers SW4 and SW2 as shown in FIG. 3. They may control the high-side field drivers so long as QFH 80 and QRH 77 control the low-side drivers.

PCM Feedback

Figure 4A:
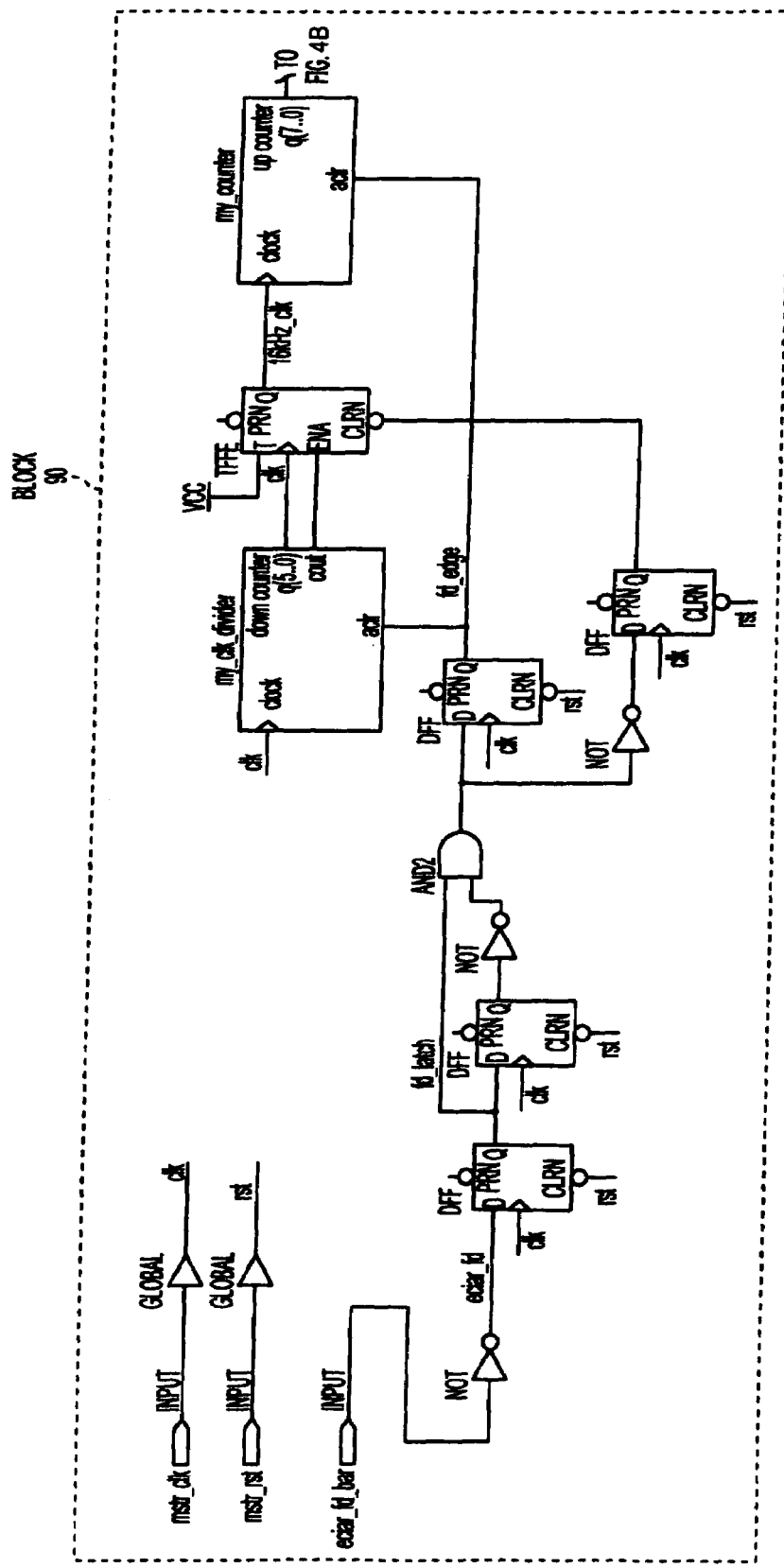
FIG. 4A is a logic block of a part of a logic block diagram of the bi-directional field control logic of the permanent magnet voltage control field-reversing regulator.
Figure 4B:
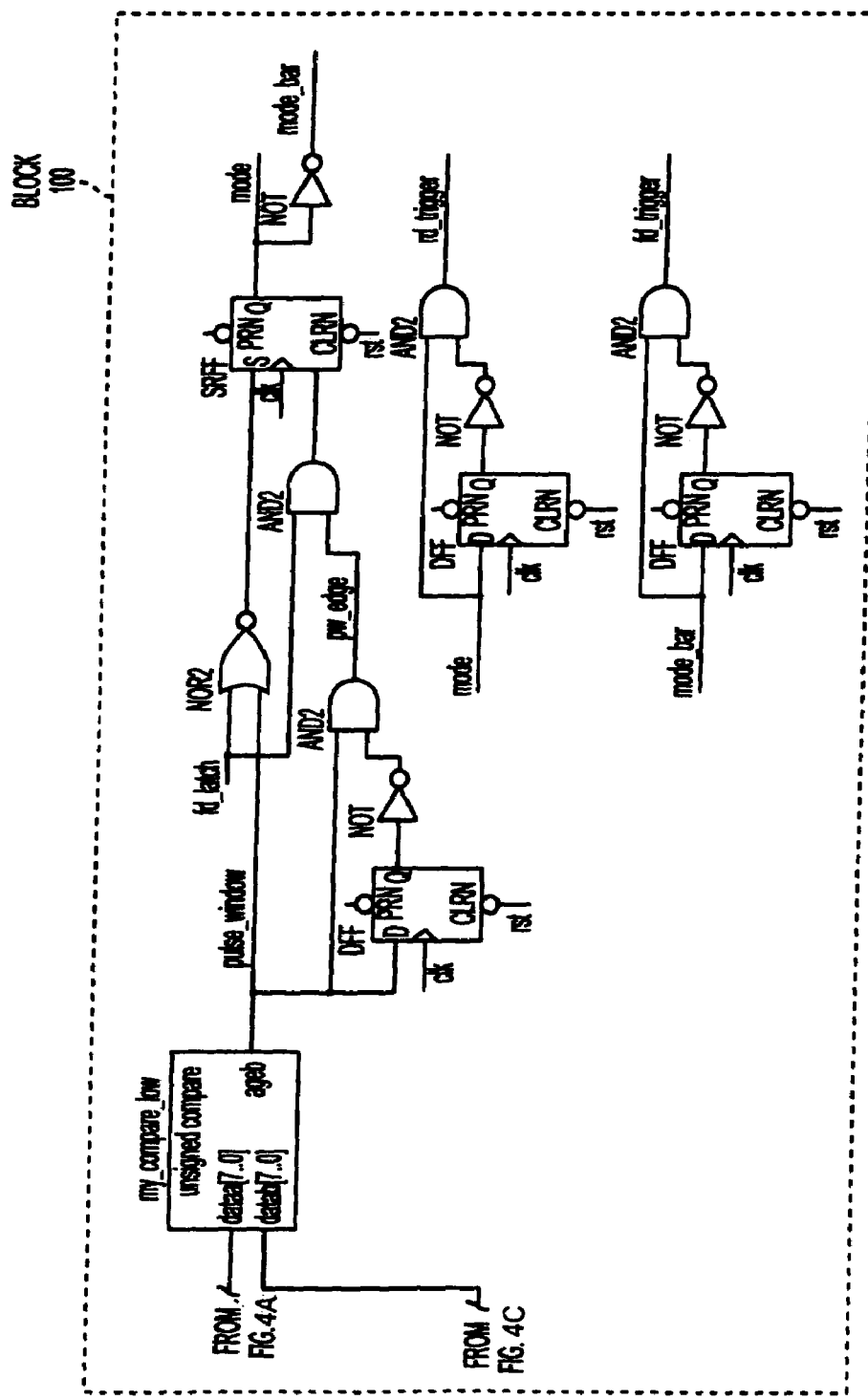
FIG. 4B is a logic block of a logic block diagram of the bi-directional field control logic of the permanent magnet voltage control field-reversing regulator.
Figure 4C:
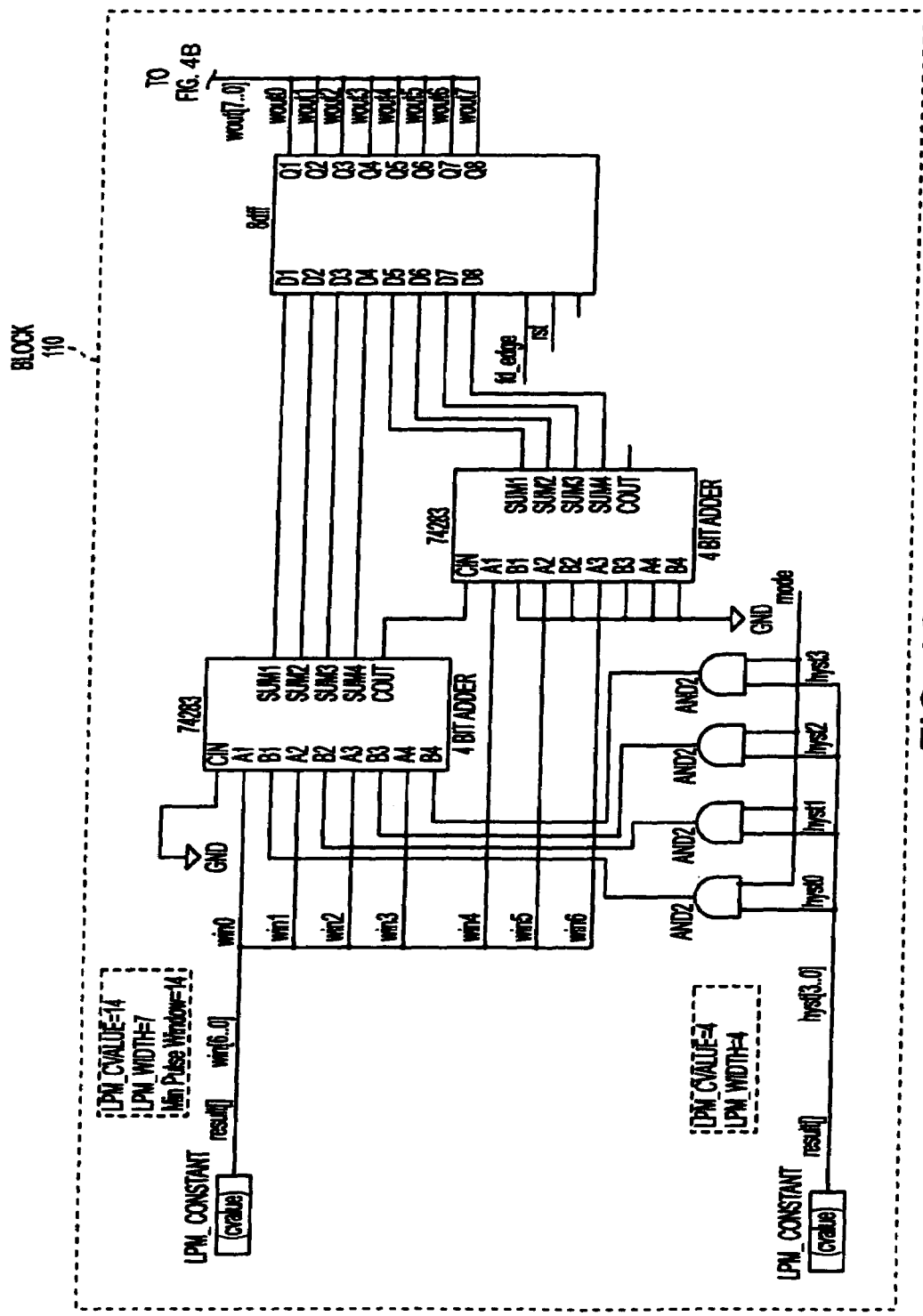
FIG. 4C is a logic block of a logic block diagram of the bi-directional field control logic of the permanent magnet voltage control field-reversing regulator.
Figure 4D:
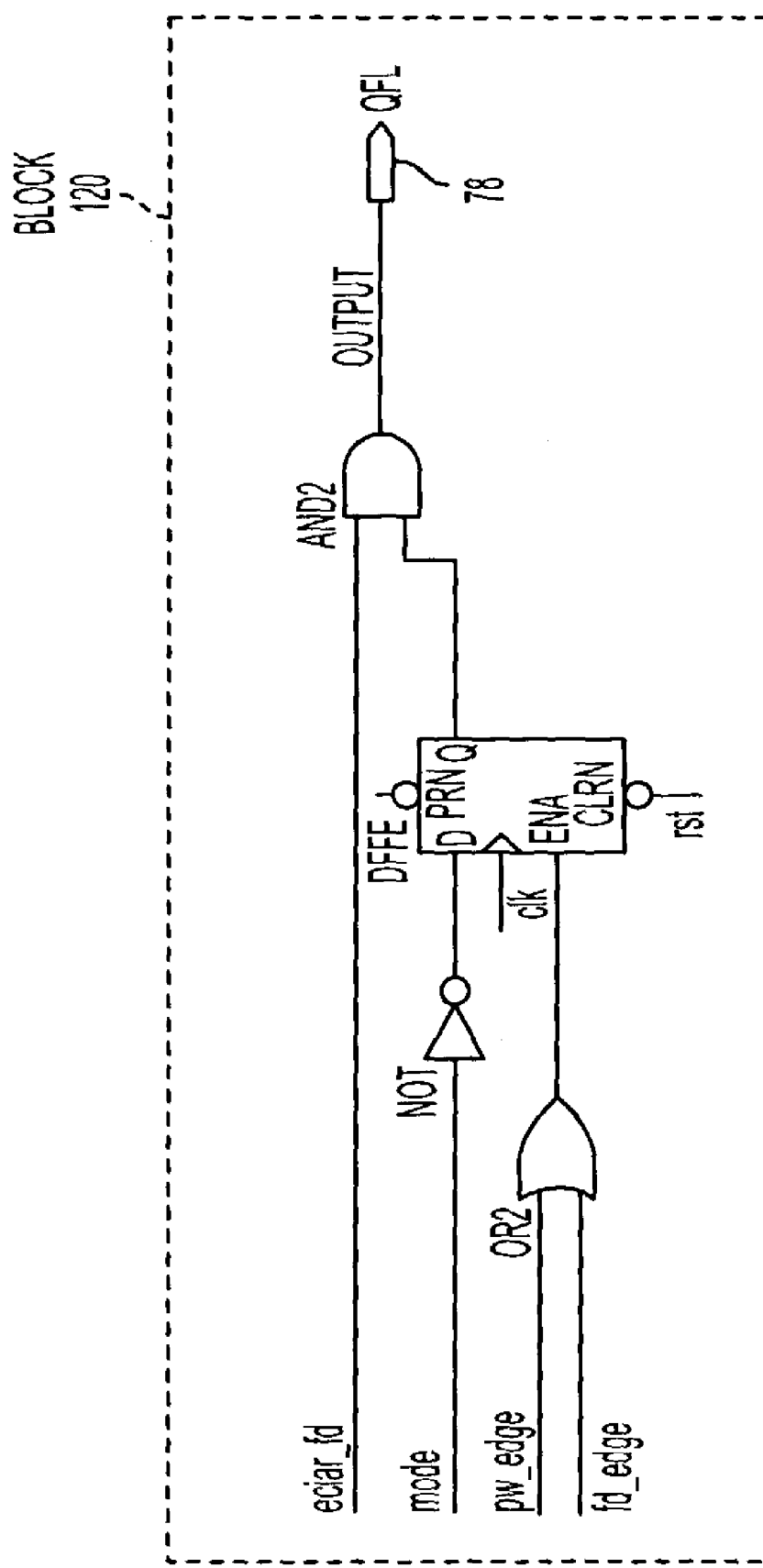
FIG. 4D is a logic block of a logic block diagram of the bi-directional field control logic of the permanent magnet voltage control field-reversing regulator.
Figure 4E:
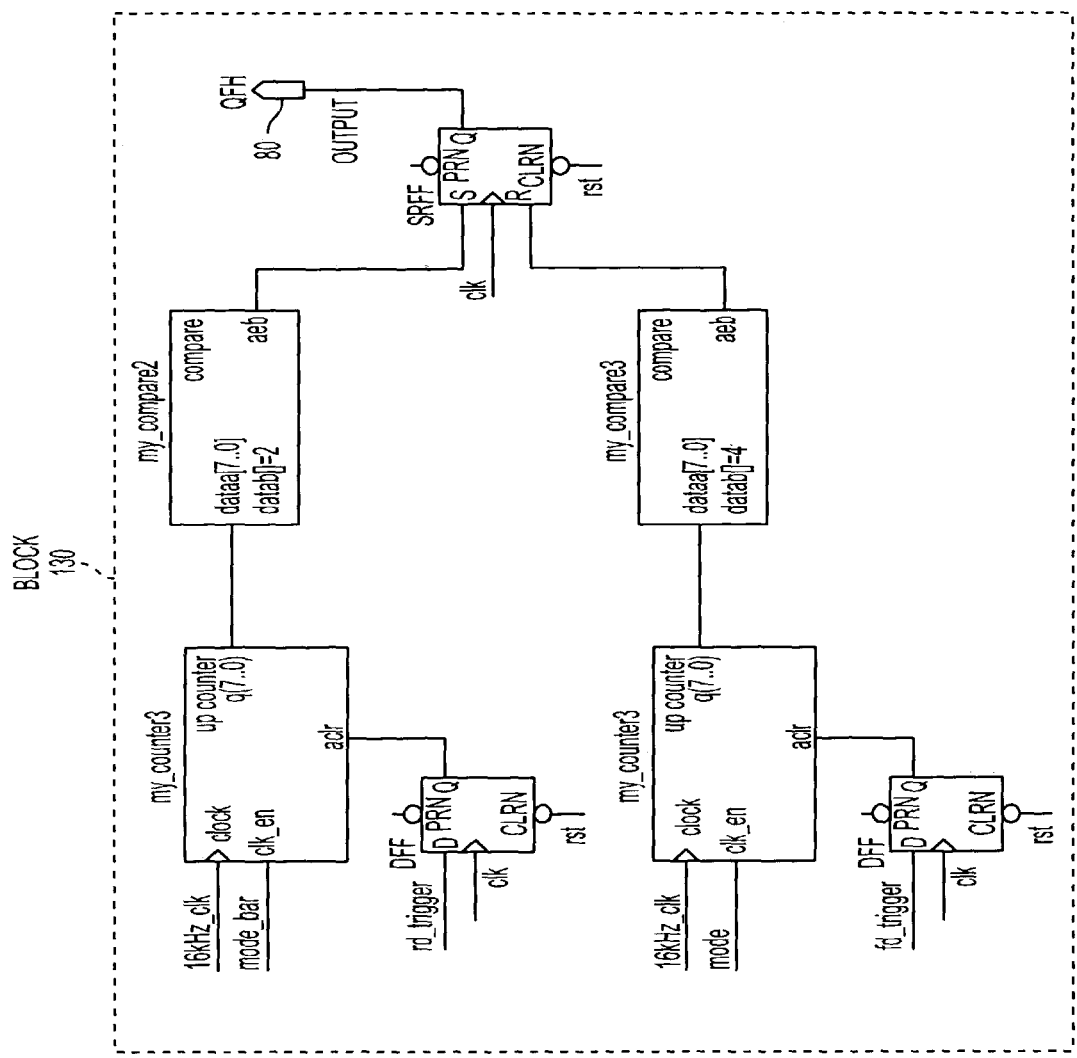
FIG. 4E is a logic block of a logic block diagram of the bi-directional field control logic of the permanent magnet voltage control field-reversing regulator.
Figure 4F:
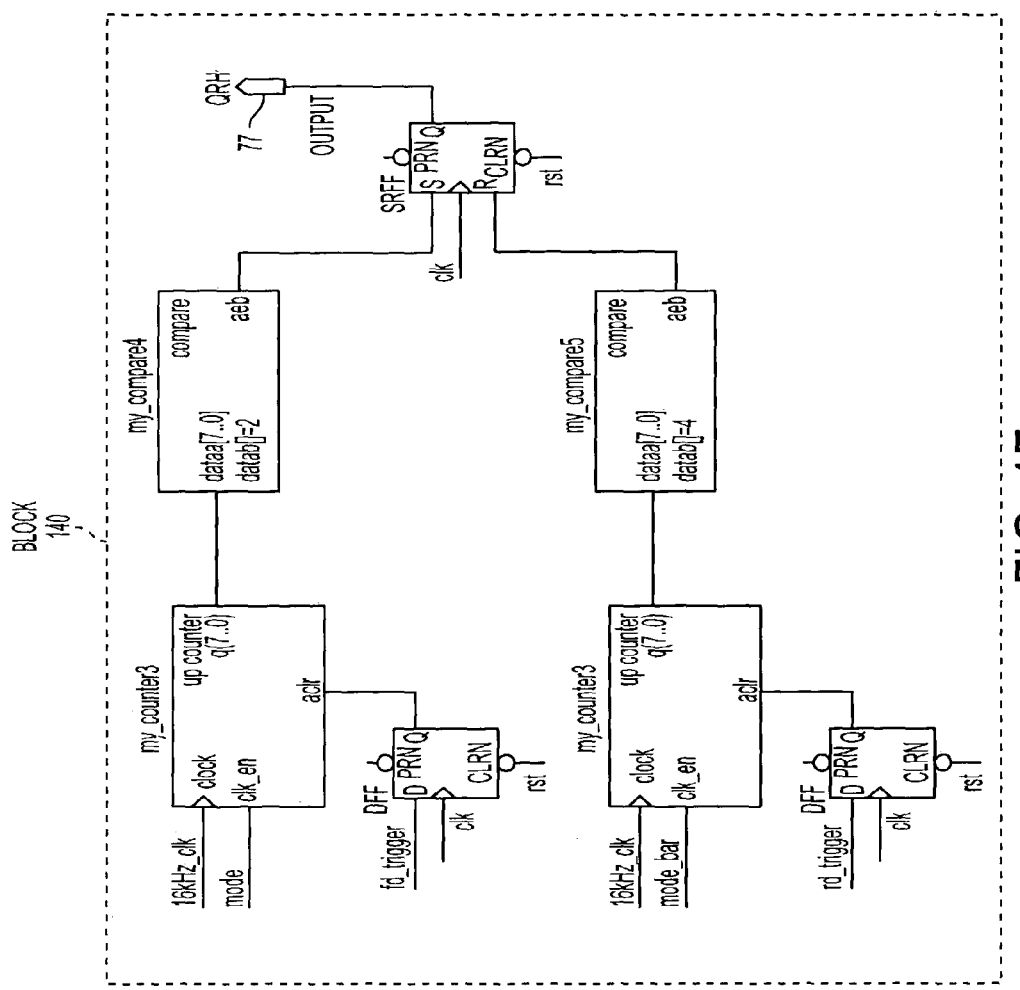
FIG. 4F is a logic block of a logic block diagram of the bi-directional field control logic of the permanent magnet voltage control field-reversing regulator.
Figure 4G:
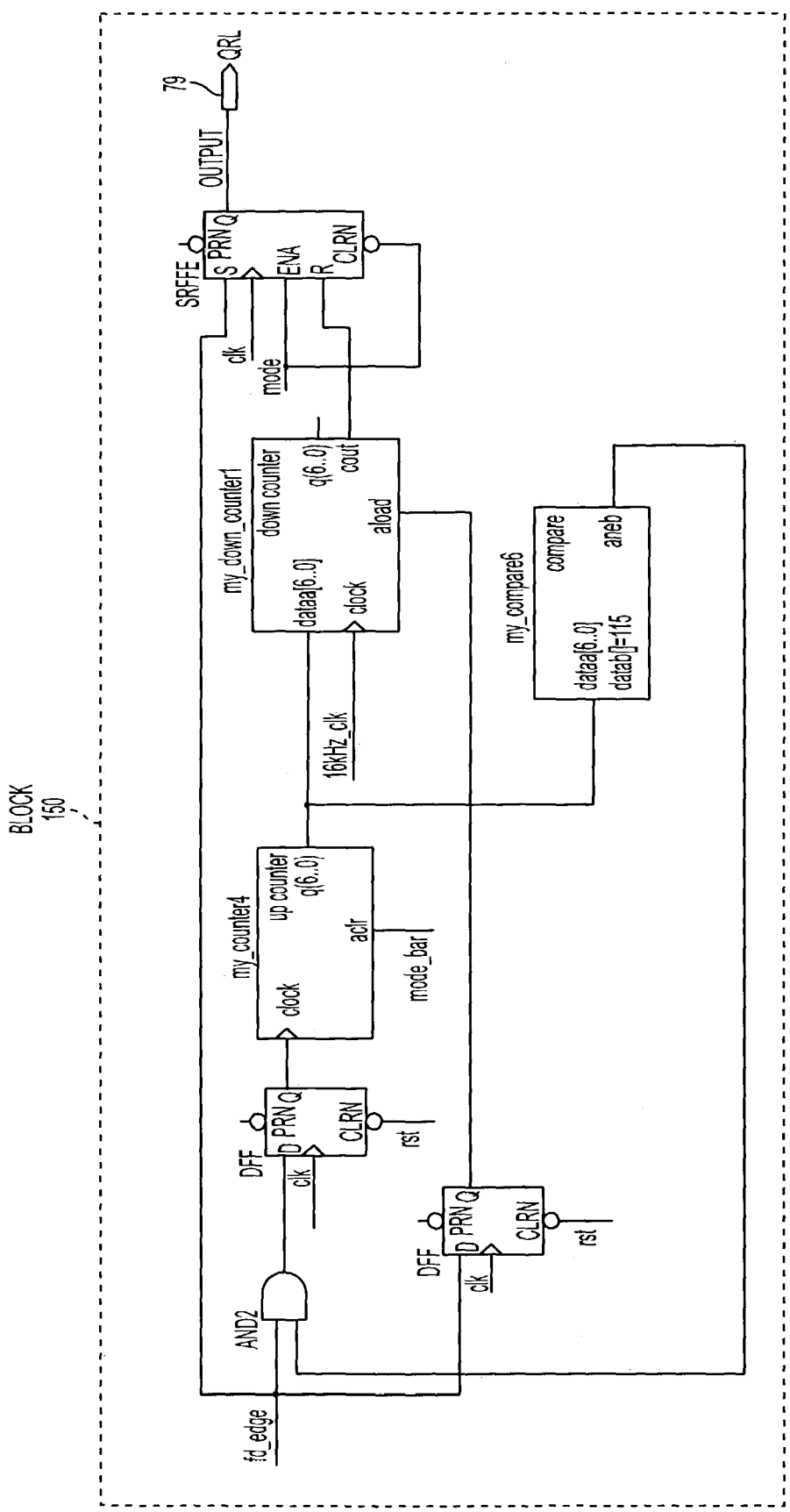
FIG. 4G is a logic block of a logic block diagram of the bi-directional field control logic of the permanent magnet voltage control field-reversing regulator.
Figure 4H:
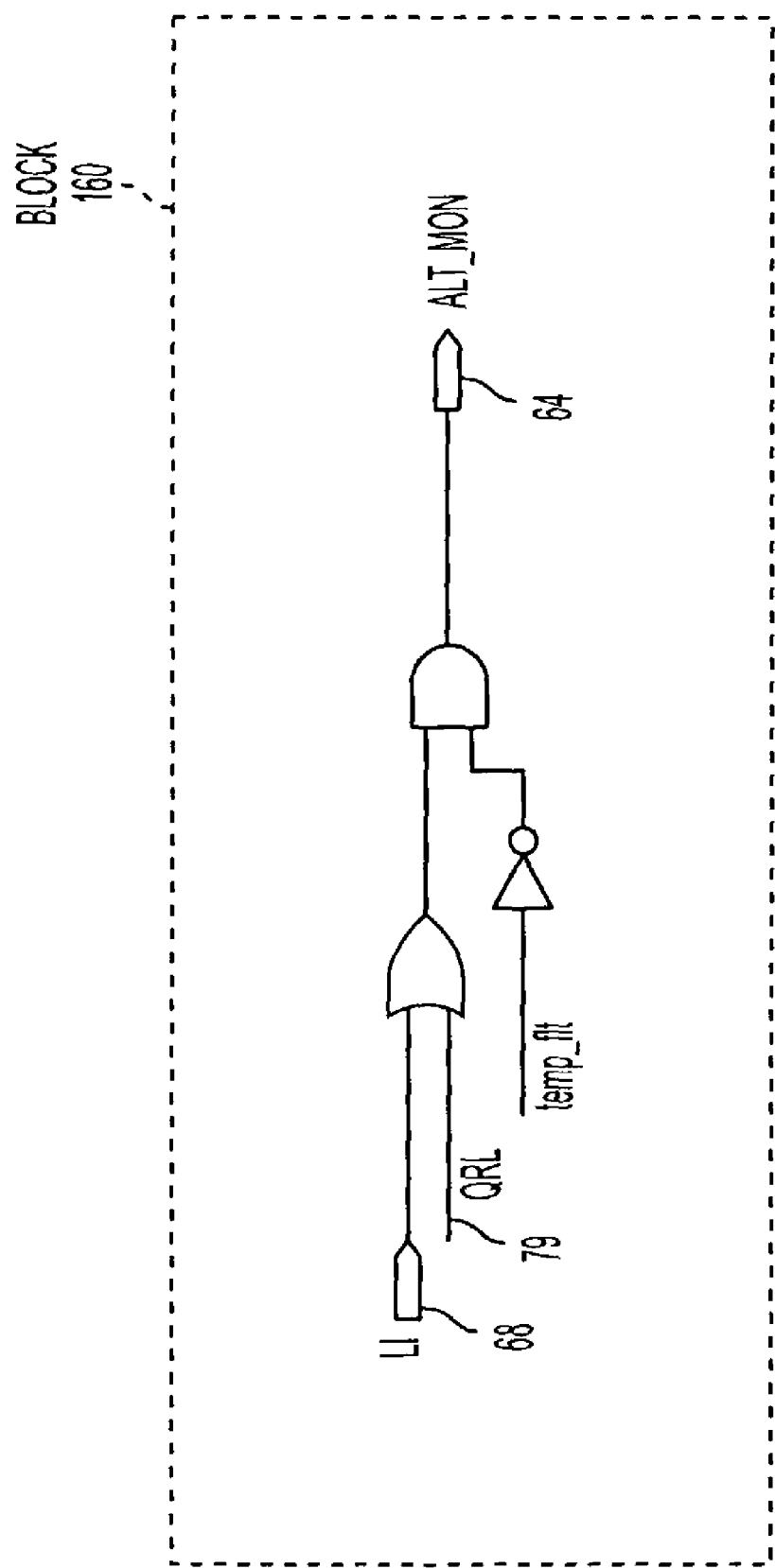
FIG. 4H is a logic block of a logic block diagram of the bi-directional field control logic of the permanent magnet voltage control field-reversing regulator.
Figure 5:
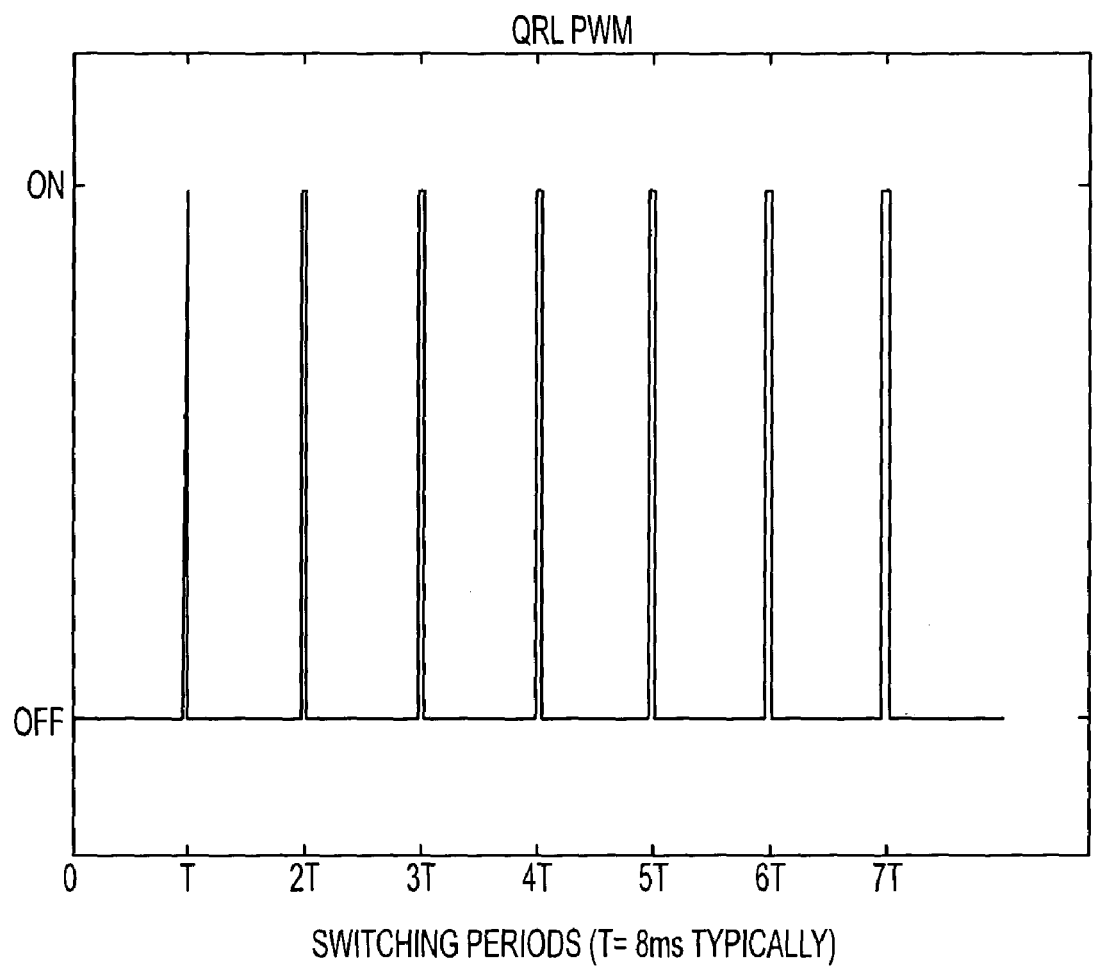
FIG. 5 illustrates a succession of increasing pulse widths for signal QRL.

Block 160 in FIG. 4H is located in the LOGIC block 70. It is the logic needed to modify, if necessary, the ECIAR's 45 fault indication LI signal 68. As stated above, the power train control module (PCM) 50 determines the set point voltage. PCM's 50 output signal alt_com 55 is used to set the voltage set point. The PCM block 50 receives the alt_non input signal 64 from Block 160 of the LOGIC block 70 and uses it to infer the generator's torque demand on the internal combustion engine. It is also the voltage regulator's fault indication signal. Alt_non 64 is the same as LI signal 68 for generators using uni-directional field excitation and LI signal 68, under non-fault conditions, reflects the field excitation duty-cycle (i.e, FD). Alt_non 64 indicates a low duty-cycle during low electrical loads and/or high speeds. The generator is not a significant load on the engine under these conditions. These same conditions may require the reverse field current to keep the system voltage from rising when generators with rotors 15 that have supplemented permanent magnets 10 are used. Nulling the effects of the permanent magnets 10 should not require more torque demand from the engine since the generator's output power should not increase (i.e., Pin=ηPout where, Pin=Tω). Therefore, alt- _mon 64 can be the same as LI 68 in generators with bi-directional field excitation. However, if needed, Block 160 shows the logic that reflects the field excitation duty-cycle regardless of the field direction. It also maintains LI's 68 fault indication mode in the event that a temperature dependent fault signal, 74, is provided.

Block 110: This block provides the threshold value used to determine if the H-bridge 72 should be either assisting or nulling the rotor's 15 permanent magnets 10. It is an 8-bit value whose magnitude is win(6 . . . 0) when mode is low (i.e., 'forward' rotor current drive to increase generator/alternator output) and win(6 . . . 0) plus hys(3 . . . 0) when mode is high (i.e., 'reverse' rotor current drive to null the influence of the rotor's 15 permanent magnets 10). The end result is a digital threshold with hysteresis. A typical value for win(6 . . . 0) is 14 which is effectively an 11% duty-cycle threshold when FD's duty-cycle is greater than this value and a typical value for win(3 . . . 0) is 4 which effectively increases the threshold to 14% when FD's duty-cycle falls below 11%.

Blocks 130 & 140: These blocks control the switching of the high-side drivers, or low-side drivers in an alternate implementation, so that the rotor's 15 field current is allowed to decay, due to its inductance, between mode transitions (i.e., switching field current direction from either 'forward' to 'reverse' or from 'reverse' to 'forward'.) It operates much like the braking feature for motor control H-bridges. Block 130 controls SW3; SW3 is normally on when mode is low. Block 140 controls SW1; SW1 is normally on when mode is high. My_counter3 and my_compare3 in block 130 controls how quickly SW3 turns-off when mode transitions from low to high (i.e., 'reverse' field current demanded). They do this by counting up to a predetermined number of system clock cycles. My_counter3 and my_compare5 in block 140 do the same for SW1 for the case when mode transitions from high to low (i.e., 'forward' field current demanded). My_counter3 and my_compare2 in block 130 controls how long SW3 waits to turn on when mode transitions from high to low. My_counter3 and my_compare4 in block 140 do the same for SW1 for the case when mode transitions from low to high. This, in effect, allows the field current to recirculate through the diodes in parallel with the H-bridge 72 switches between mode transitions so that 'forward' current is allowed to decay before 'reversing' and 'reverse' current is allowed to decay before changing directions. The timing is adjusted to accommodate rotor inductance.

While the invention has been disclosed in this patent application by reference to the details of preferred embodiments of the invention, it is to be understood that the disclosure is intended in an Illustrative rather than in a limiting sense, as it is contemplated that modification will readily occur to those skilled in the art, within the spirit of the invention and the scope of the appended claims and their equivalents.

What is claimed is:

1. A voltage regulator comprising:
   a logic block;
   a controller having a field driver control output operably connected to a first input of said logic block;
   an H-bridge;
   a drive block operably connected between said H-bridge and said logic block; and
   a control module operably connected between said controller and said drive block,
   wherein said voltage regulator is capable of regulating an output voltage of an alternator, and said logic block comprises:
   a counter having an output, whereby a number of clock cycles that occur when a field driver control signal is high is counted; and
   a comparator, whereby said output from said counter is compared to a threshold a predetermined consecutive number of times, whereby field duty cycle noise is filtered.

2. The voltage regulator according to claim 1, wherein said H-bridge comprises:
   a first pair of switches, comprising a first and a second switch connected in series;
   a second pair of switches, comprising a third and a fourth switch connected in series, wherein said first and second pair of switches arc operably connected in parallel across a power source; and
   a rotor operably connected between said series connections of said first and second pair of switches.

3. The voltage regulator according to claim 2, wherein said alternator comprises a rotor, wherein said rotor utilizes a permanent magnet in order to generate electrical power.

4. The voltage regulator according to claim 1, wherein said controller is a proportional controller for uni-directional field excitation.

5. The voltage regulator according to claim 1, wherein said control module comprises:
   an output operably connected to an input of said controller, whereby a pulse width modulated signal is transmitted to said controller; and
   an input operably connected to an output of said logic block, whereby said control module receives a torque demand signal.

6. The voltage regulator according to claim 1, wherein said alternator comprises a rotor, wherein said rotor utilizes a permanent magnet in order to generate electrical power.

7. A voltage regulator comprising:
   a logic block;
   a controller having a field driver control output operably connected to a first input of said logic block;
   an H-bridge;
   a drive block operably connected between said H-bridge and said logic block; and
   a control module operably connected between said controller and said drive block, wherein
   said voltage regulator is capable of regulating an output voltage of an alternator,
   said H-bridge comprises:
   a first pair of switches, comprising a first and a second switch connected in series;
   a second pair of switches, comprising a third and a fourth switch connected in series, wherein said first and second pair of switches are operably connected in parallel across a power source; and
   a rotor operably connected between said series connections of said first and second pair of switches, and
   said driver block comprises:
   an AND gate having a mode signal input and an inverted field driver signal input and a fourth output operably connected to a control input of said fourth switch, whereby said fourth output signal's duty cycle equal said field driver signal's duty cycle when said mode signal is low;
   a third output signal operably connected to a control input of said third switch, whereby said third switch is on when said mode signal is low;

a first output signal operably connected to a control input of said first switch, whereby said first switch is on when said mode signal is high; and a pulse width modulation circuit having a mode signal input and a second output operably connected to a control input of said second switch, whereby said second switch is pulse modulated on and off when said mode signal is high.

8. The voltage regulator according to claim 7, wherein said alternator comprises a rotor, wherein said rotor utilizes a permanent magnet in order to generate electrical power.

9. The voltage regulator according to claim 7, wherein said controller is a proportional controller for uni-directional field excitation.

10. The voltage regulator according to claim 7, wherein said control module comprises:

an output operably connected to an input of said controller, whereby a pulse width modulated signal is transmitted to said controller; and an input operably connected to an output of said logic block, whereby said control module receives a torque demand signal.

11. A voltage regulator comprising:

a logic block;

a controller having a field driver control output operably connected to a first input of said logic block;

an H-bridge;

a drive block operably connected between said H-bridge and said logic block; and a control module operably connected between said controller and said drive block, wherein said voltage regulator is capable of regulating an output voltage of an alternator, said H-bridge comprises:

a first pair of switches, comprising a first and a second switch connected in series;

a second pair of switches, comprising a third and a fourth switch connected in series, wherein said first and second pair of switches are operably connected in parallel across a power source; and a rotor operably connected between said series connections of said first and second pair of switches, and said driver block comprises:

a mode signal input and a pulse width modulation input operably connected to corresponding outputs of said logic block;

a first output signal operably connected to a control input of said first switch, whereby said first switch is on when said mode signal is high;

a second output operably connected to a control input of said second switch, whereby said second switch is pulse modulated on and off when said made signal is high;

a third output signal operably connected to a control input of said third switch, whereby said third switch is on when said mode signal is low; and a fourth output operably connected to a control input of said fourth switch, whereby said fourth output signal's duty cycle equal said field driver control signal's duty cycle when said mode signal is low.

12. The voltage regulator according to claim 11, wherein said logic block comprises:

a counter having an output, whereby a number of clock cycles that occur when a field driver control signal is high is counted; and a comparator, whereby said output from said counter is compared to a threshold a predetermined consecutive number of times, whereby field drive duty cycle noise is filtered.

13. The voltage regulator according to claim 12, wherein said alternator comprises a rotor, wherein said rotor utilizes a permanent magnet in order to generate electrical power.

14. The voltage regulator according to claim 11, wherein said alternator comprises a rotor, wherein said rotor utilizes a permanent magnet in order to generate electrical power.

15. The voltage regulator according to claim 11, wherein said controller is a proportional controller for uni- directional field excitation.

16. The voltage regulator according to claim 11, wherein said control module comprises:

an output operably connected to an input of said controller, whereby a pulse width modulated signal is transmitted to said controller; and an input operably connected to an output of said logic block, whereby said control module receives a torque demand signal.

* * * * *

UNITED STATES PATENT AND TRADEMARK OFFICE
CERTIFICATE OF CORRECTION

PATENT NO. : 7,038,406 B2  Page 1 of 1
APPLICATION NO. : 10/360411
DATED : May 2, 2006
INVENTOR(S) : Scott R. Wilson It is certified that error appears in the above-identified patent and that said Letters Patent is hereby corrected as shown below:

Column 3, line 1 after "voltage" delete --,--.

Column 5, line 33 "10" should be --110--.

Column 5, line 54 "ECLAR" should be --ECIAR--.

Column 6, line 15 "win[6.0]" should be --win[6...0]--.

Column 7, line 4 "ECLAR's" should be --ECIAR's--.

Column 8, line 51 "alt_non" should be --alt_mon--.

Column 8, line 55 "Alt_non" should be --Alt_mon--.

Column 8, line 58 "Alt_non" should be --Alt_mon--.

Column 9, line 11 "(6...0)" should be --(6..0)--.

Column 9, line 12 "(6...0)" should be --(6..0)--.

Column 9, line 12 "(3...0)" should be --(3..0)--.

Column 9, line 16 "(6...0)" should be --(6..0)--.

Column 9, line 18 "(3...0)" should be --(3..0)--.

Column 10, line 17, Claim 2 "arc" should be --are--.

Column 12, line 6, Claim 11 "made" should be --mode--.

Signed and Sealed this

Twenty-second Day of August, 2006

JON W. DUDAS
*Director of the United States Patent and Trademark Office*